(12) United States Patent
Neuenschwander et al.

(10) Patent No.: US 7,337,531 B2
(45) Date of Patent: Mar. 4, 2008

(54) DIE ASSEMBLY AND METHOD FOR MANUFACTURING LAMINA STACKS FROM A PLURALITY OF SEPARATE STRIPS OF STOCK MATERIAL

(75) Inventors: Thomas R Neuenschwander, Fort Wayne, IN (US); Barry A Lee, Fort Wayne, IN (US)

(73) Assignee: L.H. Carbide Corporation, Fort Wayne, IN (US)

( * ) Notice: Subject to any disclaimer, the term of this patent is extended or adjusted under 35 U.S.C. 154(b) by 309 days.

(21) Appl. No.: 10/959,292

(22) Filed: Oct. 6, 2004

(65) Prior Publication Data

US 2006/0070233 A1    Apr. 6, 2006

(51) Int. Cl.
*H01F 3/04* (2006.01)
*B23P 21/00* (2006.01)

(52) U.S. Cl. .......................................... 29/609; 29/779
(58) Field of Classification Search .................. 29/609, 29/412, 733, 738, 729, 771, 779, 783, 598, 29/521, 33 P, 33 Q; 72/336, 339
See application file for complete search history.

(56) References Cited

U.S. PATENT DOCUMENTS 2,260,899 A * 10/1941 Heftler ........................ 29/433
4,029,252 A * 6/1977 Hawkins ..................... 228/3.1
4,597,168 A   7/1986 Oboshi et al.
4,619,028 A   10/1986 Neuenschwander ............ 29/33
5,241,138 A   8/1993 Neuenschwander .......... 177/50
5,349,741 A   9/1994 Neuenschwander .......... 29/598
5,406,243 A   4/1995 Jenkins et al.
5,755,023 A   5/1998 Neuenschwander
5,799,387 A   9/1998 Neuenschwander et al. .. 29/598
5,881,450 A   3/1999 Neuenschwander .......... 29/609
6,163,949 A   12/2000 Neuenschwander
6,192,575 B1   2/2001 Neuenschwander .......... 29/609

* cited by examiner

*Primary Examiner*—John C. Hong
(74) *Attorney, Agent, or Firm*—Baker & Daniels, LLP

(57) ABSTRACT

A progressive die assembly and a method for manufacturing lamina stacks from a plurality of separate strips of stock material. The die assembly includes a plurality of feed pathways for the material strips, each feed pathway having an associated punch set. Each punch set includes one or more punches for stamping lamina features in the strip, as well as at least one blanking punch for blanking individual laminas from the strips. The die assembly additionally includes a choke assembly which is adapted to receive laminas which are blanked from each of the material strips by the blanking punches.

30 Claims, 11 Drawing Sheets

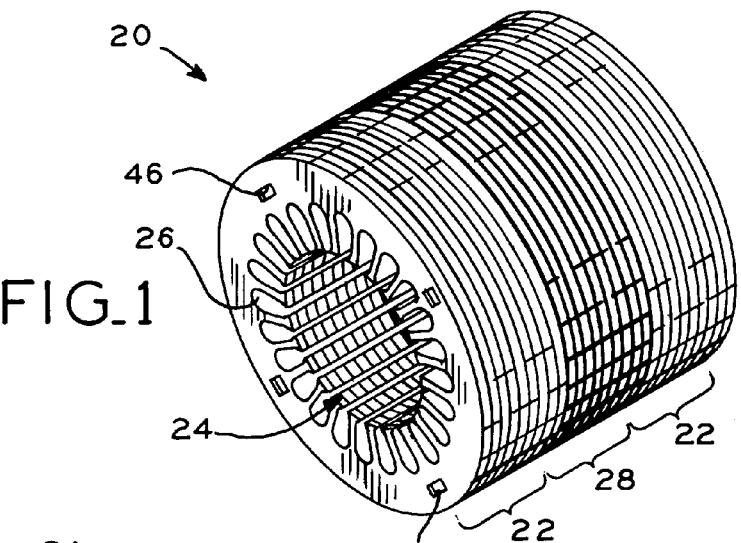
FIG_1
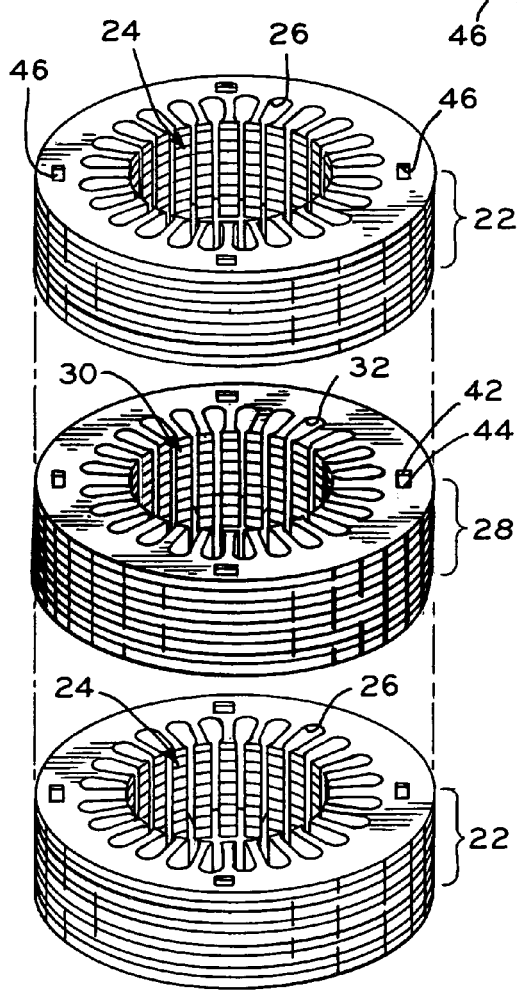
FIG_2
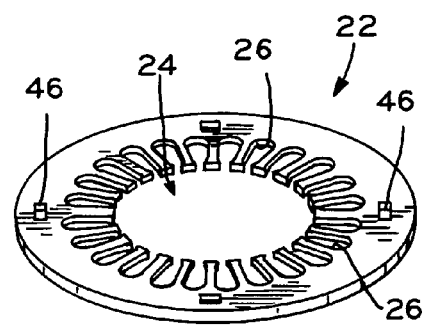
FIG_3
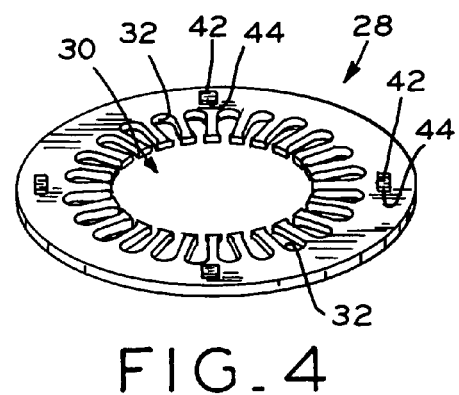
FIG_4

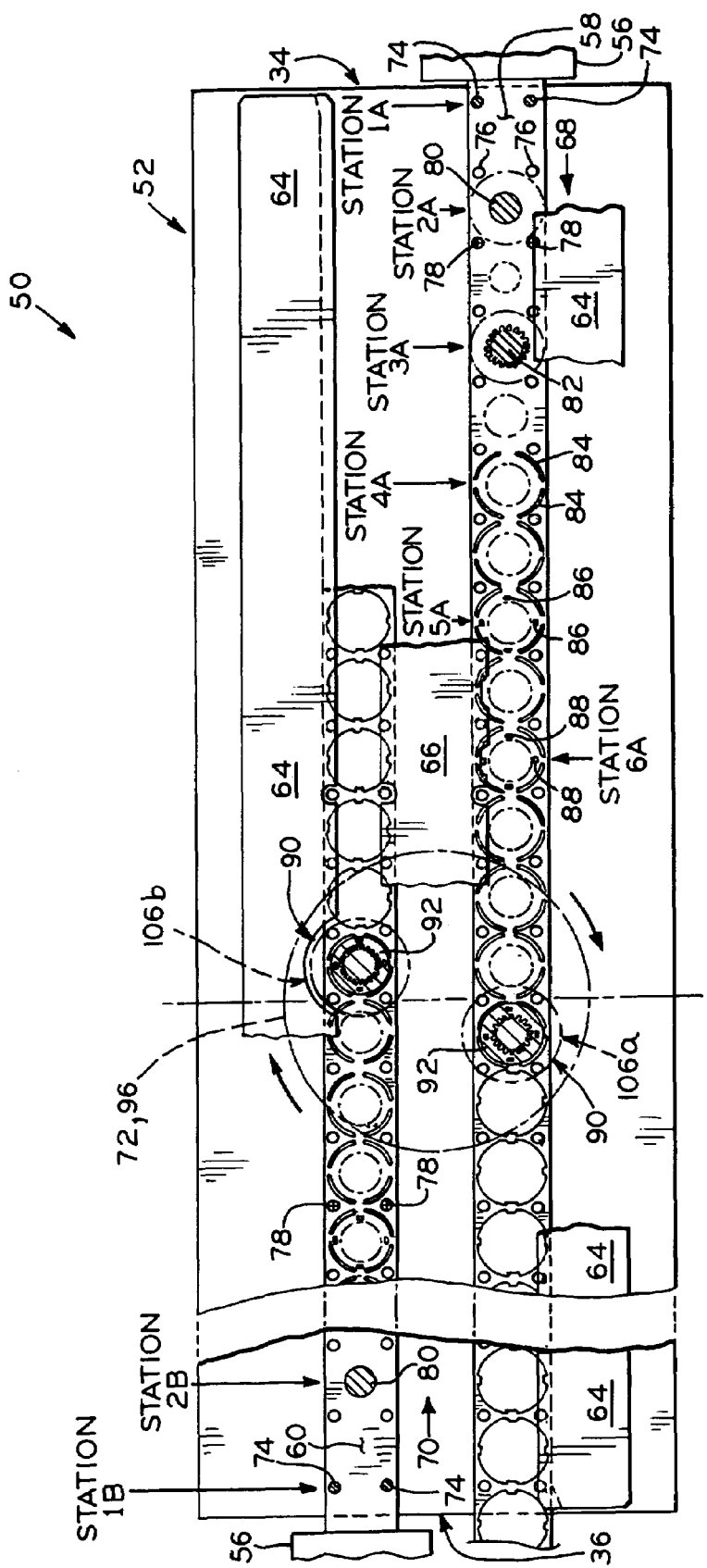
FIG._5

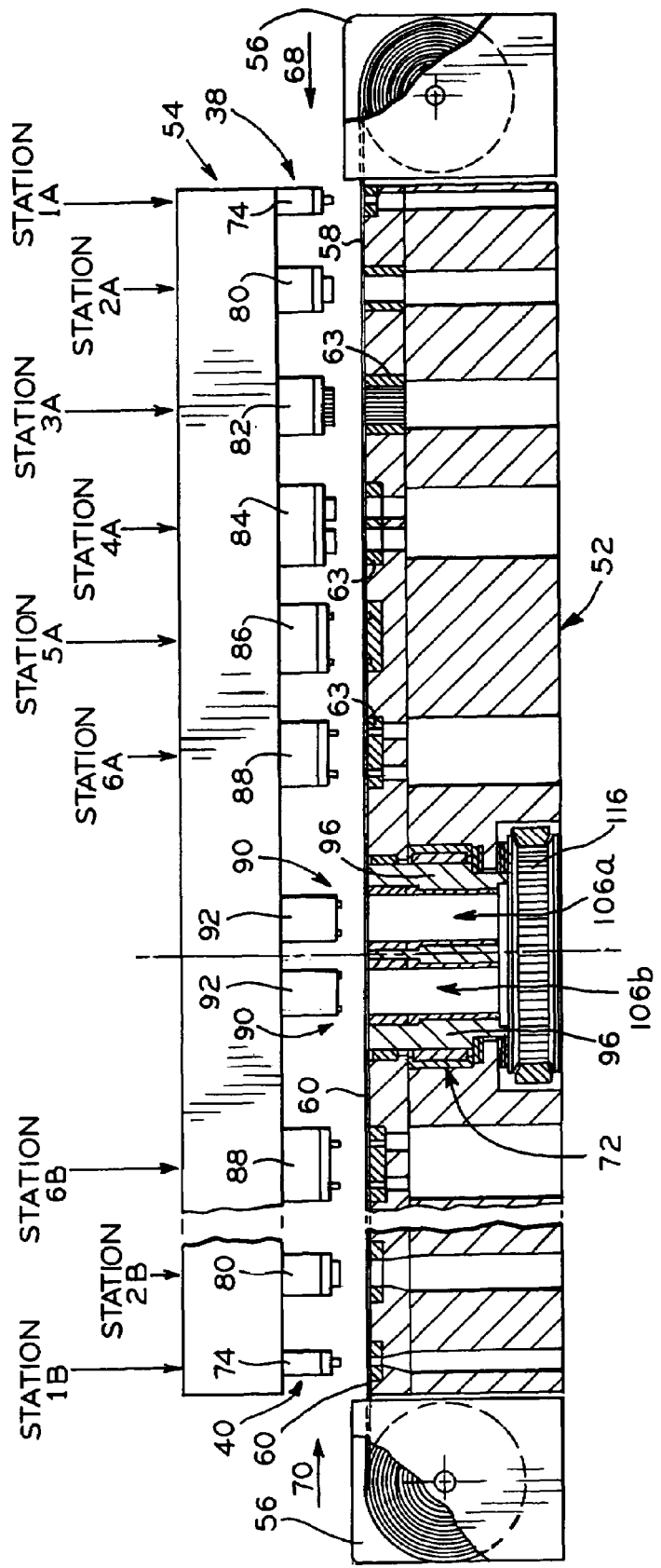
FIG_6

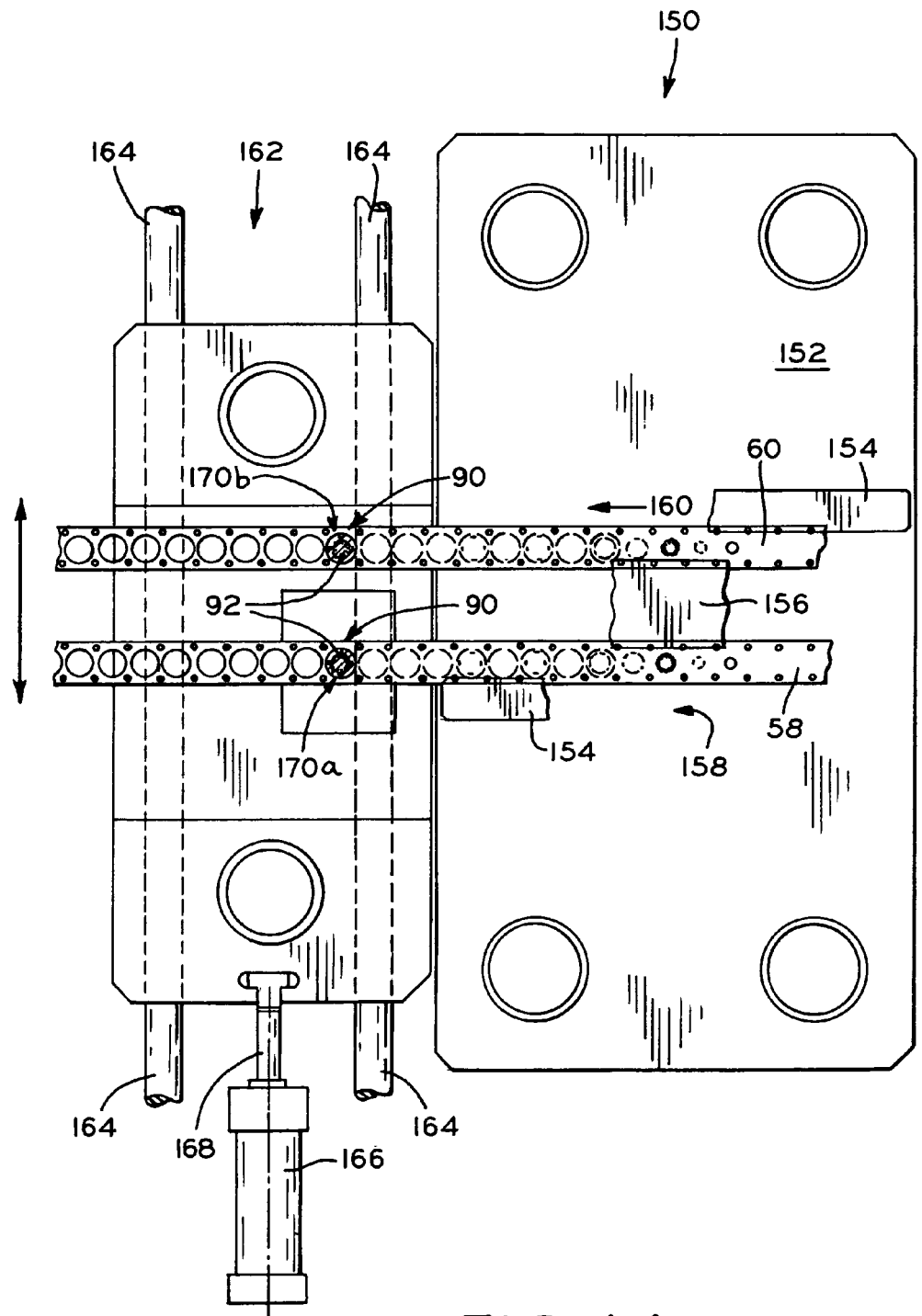
FIG_14

DIE ASSEMBLY AND METHOD FOR MANUFACTURING LAMINA STACKS FROM A PLURALITY OF SEPARATE STRIPS OF STOCK MATERIAL

BACKGROUND OF THE INVENTION

1. Field of the Invention

The present invention relates to a progressive die assembly and a method for manufacturing lamina stacks from a plurality of separate strips of stock material.

2. Description of the Related Art

The manufacture of parts, e.g., stators and rotors for electric motors, ignition assembly cores, or other parts which employ stacked laminas is well known in the art. Typically, the laminas are blanked from a continuous strip of stock material and are then stacked and bound together to form the completed part. Progressive die assemblies for producing lamina stacks, wherein a strip of lamina material is fed through a sequence of punching steps to progressively form the laminas to the desired end configurations, are also well known.

One type of lamina stack, for example, includes a plurality of individual layers of stacked laminas, wherein some of the laminas are made from a first type of material and others of the laminas are made from a second, different type of material. The laminas of the different materials are attached to one another in a suitable manner such as by binding the entire stack together with a cleat. For example, one such lamina stack may include a first portion, or first set, of lamina layers made from a first type of metal, and a second portion, or second set, of lamina layers made from a second type of metal.

Problematically, known progressive die assemblies are configured to stamp laminas from only a single strip of stock material which is fed into the die, wherein the individual laminas are progressively shaped by punches in the die and are thereafter blanked or separated from the remainder of the strip and then stacked in a choke assembly. One of ordinary skill in the art would readily recognize that changing the type of stock material which is fed into the die to manufacture the respective layers or portions of each lamina stack would be extremely inefficient, if not impossible.

Another potential method of manufacturing the foregoing types of lamina stacks would be to use two separate progressive die assemblies, one die assembly forming first portions or first sets of lamina layers of the stacks from strips of a first material, such as a first type of metal, and a second die assembly forming second portions or second sets of lamina layers of the stacks from strips of a second material, such as a second type of metal. Thereafter, to form each stack, a first portion may be manually secured to a second portion, such as by using a cleat which is applied by a manually-actuated hand press, for example. A disadvantage with the foregoing method is that same requires a manual step for the assembly of each lamination stack, thereby leading to production inefficiencies when very large numbers of stacks are produced. The foregoing method is particularly inefficient where the lamina stacks include several interleaved layers of laminas made from different materials.

What is needed is a die assembly and method which is an improvement over the foregoing.

SUMMARY OF THE INVENTION

The present invention provides a progressive die assembly and a method for manufacturing lamina stacks from a plurality of separate strips of stock material. The die assembly includes a plurality of feed pathways for the material strips, each feed pathway having an associated punch set. Each punch set includes one or more punches for stamping lamina features in the strip, as well as at least one blanking punch for blanking individual laminas from the strips. The die assembly additionally includes a choke assembly which is adapted to receive laminas which are blanked from each of the material strips by the blanking punches.

In particular, the die assembly generally includes upper and lower die assemblies, along with punches, piloting structure, and a plurality of feeders for independently feeding separate strips of stock material into the die assembly. In one embodiment, the die assembly includes first and second feed paths which extend into the die assembly from respective opposite sides of the die, and into which separate strips of stock material may be fed by the feeders. Each feed path includes a punch set including one or more punches for selectively shaping one or more rows of laminas in each strip by punching lamina features in the strips, together with at least one blanking punch for blanking, or separating, individual laminas from the strip.

The choke assembly includes one or more choke cavities into which laminas from each of the separate strips are blanked and interlocked to form the lamina stacks. In one embodiment, the choke assembly is rotatable to selectively align the choke cavities with the blanking punches of the punch sets to accept laminas blanked from each strip of material. In another embodiment, the choke assembly is selectively movable in a transverse direction relative to the length of at least one of the strips to "shuttle" between the blanking punches of the punch sets to accept laminas blanked from each strip of material.

The separate strips of stock material may be fed into the die assembly independently of one another by the feeders wherein, for example, one strip may be advanced to blank laminas therefrom into the choke assembly while another strip is idled. Thereafter, the other strip may be advanced into the choke assembly to blank laminas therefrom into the choke assembly while the first strip is idled. Further, during certain points in the manufacturing sequence, both strips may be simultaneously advanced into the die assembly for simultaneous blanking of laminas therefrom into respective choke cavities of the choke assembly. For example, the individual choke cavities of the choke assembly may concurrently receive respective laminas which are blanked from the first and second strips of stock material while each strip is advanced into the die assembly, followed by rotation of the choke assembly to align the different sets of choke cavities thereof with different ones of the first and second strips of stock material. In this manner, the present die assembly may efficiently manufacture a large number of individual lamina stacks in a very short amount of time.

For example, in one embodiment, the choke assembly includes a plurality of choke cavities, the choke assembly rotatable such that the choke cavities thereof are selectively aligned with respective blanking punches associated with the first and second punch sets. The choke assembly may be moved between a first position in which a first plurality of the choke cavities are aligned with the blanking punches of the first punch set and a second plurality of the choke cavities are aligned with the blanking punches of the second punch set. In this position, the material strips may be concurrently fed into the die to simultaneously blank laminas from each of the strips into the choke cavities of the first and second pluralities. Then, while the material strips are idled, the choke assembly may be rotated to a second position in which the second plurality of choke cavities are aligned with the blanking punches of the first punch set and the first plurality of choke cavities are aligned with the blanking punches of the second punch set, followed by feeding the material strips into the die to simultaneously blank laminas from each of the strips into the choke cavities of the first and second pluralities.

The individual laminas of each stack may be interlocked with one another in the choke assembly substantially concurrently with the blanking operation to form interlocked lamina stacks each including individual laminas which are made from different or the same materials.

Advantageously, the present die assembly may be used to manufacture lamina stacks which include interleaved layers made from different materials, such as lamina stacks having a first portion or set of lamina layers made from a first type of metal, and a second portion or set of lamina layers made from a second type of metal, with the laminas interlocked with one another in the die assembly. Therefore, the need for manual assembly steps, such as the assembly of portions of each stack which are made from different materials using a manual press, for example, is eliminated.

Also, the present die assembly may be used to manufacture lamina stacks which include interleaved layers made from first and second separate strips of the same material, such as lamina stacks having a first portion or set of lamina layers made from a first strip of metal, and a second portion or set of lamina layers made from a second, separate strip of the same type of metal. The foregoing method may be useful in many applications. For example, a die assembly may use two separate strips of the same material, with the strips having differing thicknesses or differing widths. In particular, if a lamina stack is desired which includes individual laminas having different outer diameters, the die assembly may be configured to stamp laminas of a first type, such as laminas having a relatively shorter diameter, from a first strip according to first progression, and stamp laminas of a second type, such as laminas having a relatively longer diameter, from a second strip according to a second, different progression. In this manner, stock material is conserved because the need to stamp both small and large diameter laminas from the same strip of stock material, as in known die assemblies, is obviated.

In one form thereof, the present invention provides a die assembly for manufacturing lamina stacks from a plurality of separate strips of stock material, including a first punch set including one or more punches configured to punch laminas from a strip of material; a second punch set including one or more punches configured to punch laminas from another, separate strip of material; and a choke assembly adapted to receive at least one lamina punched from each of the strips to form a lamina stack.

In another form thereof, the present invention provides a die assembly for manufacturing lamina stacks from first and second separate strips of stock material, including a first feed pathway into which the first strip of stock material may be fed; a second feed pathway into which the second strip of stock material may be fed; blanking punches associated with the first and second feed pathways, the blanking punches operable to blank laminas from the first and second strips; and at least one choke assembly adapted to receive at least one lamina blanked from the first strip and at least one lamina blanked from the second strip to form a lamina stack.

In a further form thereof, the present invention provides a method of manufacturing lamina stacks in a die assembly, including the steps of guiding a plurality of separate strips of stock material through the die assembly; blanking laminas from each of the strips; and transferring blanked laminas from each of the strips into at least one common choke assembly which is adapted to receive laminas from each of the strips to form lamina stacks.

In a still further form thereof, the present invention provides a method of manufacturing lamina stacks in a die assembly, including the steps of guiding first and second separate strips of stock material through the die assembly; aligning a choke cavity with the first strip; blanking at least one first lamina from the first strip into the choke cavity; moving the choke cavity into alignment with the second strip; and blanking at least one second lamina from the second strip into the choke cavity to form a lamina stack.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 1 is a perspective view of an exemplary lamina stack which may be manufactured with the die assemblies and methods of the present invention;

FIG. 2 is a partially exploded view of the lamina stack of FIG. 1, showing a first portion, or set of laminas, of the stack which are made from a first material, a second portion, or set of laminas, of the stack which are made from a second material, and a third portion, or set of laminas, of the stack which are made from the first material;

FIG. 3 is a perspective view of a first type of lamina of the lamina stack of FIGS. 1 and 2;

FIG. 4 is a perspective view of a second type of lamina of the lamina stack of FIGS. 1 and 2;

FIG. 5 is a top view of the lower die assembly of a die assembly according to the present invention, showing the strip layouts of a pair of separate strips of stock material which may be fed into the die assembly, wherein a complete first punch set and strip layout are shown on the right, and a partial second punch set and strip layout are shown on the left, and further showing a rotatable choke assembly in dashed lines;

FIG. 6 is an elevational, partially sectioned view of the die assembly, showing the lower die assembly, the upper die assembly, punch sets, choke assembly, and a pair of stock material feeders, wherein the punch set and other features associated with a first feed pathway and first material strip are shown to the right of the vertical dashed line, and portions of the punch set and other features associated with a second feed pathway and second material strip are shown to the left of the vertical dashed line;

FIG. 14 is a top view of a lower die assembly of a die assembly according to a third embodiment, including a choke assembly which is movable in a transverse direction relative to the length of a pair of strips of stock material.

Figure 7:
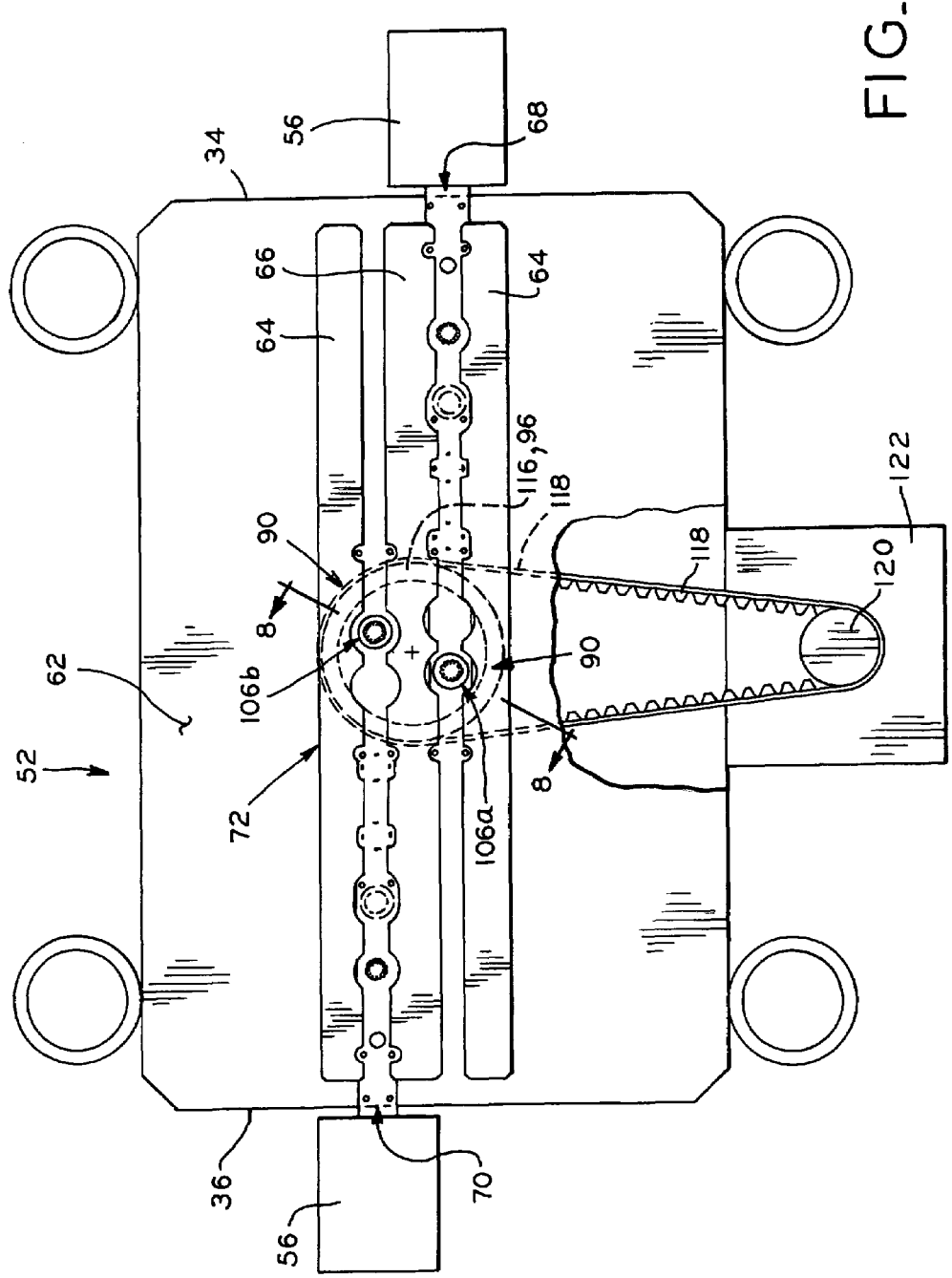
FIG. 7 is a top view of a portion of the lower die assembly, showing further details of the choke assembly with rotatable choke barrel.

Corresponding reference characters indicate corresponding parts throughout the several views. The exemplifications set out herein illustrate preferred embodiments of the invention, and such exemplifications are not to be construed as limiting the scope of the invention any manner. Certain features of the present invention are not necessarily drawn to scale in the views, and some features of the present invention have been shown exaggerated in order to better illustrate same.

DETAILED DESCRIPTION

Referring first to FIGS. 1-4, an exemplary lamina stack 20 which may be manufactured using the die assemblies and methods of the present invention is shown. Lamina stack 20 includes a plurality of stacked, generally circular laminas, which are interlocked with respect to one another in the manner described below. Although shown as circular, the outer shape or profile of the laminas and, in turn, the overall shape or profile of the lamina stack, may vary. Lamina stacks 20, or lamina stacks similar thereto, may be used as electric motor stators or rotors, or in other applications.

Referring to FIGS. 3 and 4, lamina stack 20 is made from two different types of laminas. As shown in FIG. 3, first lamina 22 has a circular periphery, with a large central opening 24 surrounded by a plurality of winding slots 26. Second lamina 28, shown in FIG. 4, also has a circular periphery, and includes a central opening 30 surrounded by a plurality of winding slots 32.

In the exemplary lamina stack 20 of FIGS. 1-4, first laminas 22 are made from a first type of material and, as described below, are punched from a common first strip of stock material by the die assembly, while second laminas 28 are made from a second material different than the first material and, as described below, are punched from a second, separate strip of stock material by the die assembly. In one embodiment, first laminas 22 are punched from a strip of magnetic stainless steel, for example, while second laminas 28 are punched from a strip of non-magnetic stainless steel.

Additionally, as shown in FIGS. 3 and 4, each of the laminas 22 and 28, except for the topmost first lamina 22 in lamina stack 20, includes a plurality of interlock tabs 42 punched therein, each of which extends outwardly from a surface thereof to define a corresponding interlock recess 44 in the opposite side thereof. Interlock tabs 42 and recesses 44 are also shown in FIGS. 8-12 and described below. The topmost first lamina 22 in lamina stack 20 includes a set of apertures 46 punched therein which are adapted to receive the interlock tabs 42 of the next, adjacent first lamina 22 in lamina stack 20. Other than the topmost first lamina 22, the interlock tabs 42 of each lamina in lamina stack 20 interlock into the interlock recesses 44 of an adjacent lamina to thereby interlock all of the laminas in lamina stack 20 with one another. The foregoing interlock arrangement for interlocking laminas in a stack is described in further detail below, and is also described in detail in U.S. Pat. Nos. 4,619,028, 5,241,138, 5,349,741 and 6,163,949 to Neuenschwander, each assigned to the assignee of the present invention, the disclosures of which are expressly incorporated herein by reference. Although interlock tabs 42 and recesses 44 are shown as rectangular herein, the shape of same may vary, as discussed in the foregoing patents. Further details regarding lamina stacks which include individual lamina layers which may have two or more discrete lamina portions, and the manner of manufacturing same, are described in the above-incorporated U.S. Pat. No. 6,163,949 to Neuenschwander.

Referring to FIG. 2, the lamina stack 20 generally includes, in sequential order from the top of lamina stack 20 downwardly in FIG. 2, a first portion including nine first laminas 22, a second portion including nine second laminas 28, and a third portion including nine first laminas 22. As shown in FIG. 2, because the first laminas 22 are made of the same material, the first laminas 22 define first and third portions, or sets of laminas, of stack 20 made of a first material and, because the second laminas 28 are made of a material which is different from the first material, the second laminas 28 define a second portion, or set of laminas, of stack 20 made of a second material different from the first material.

Referring to FIGS. 5-7, die assembly 50 according to a first embodiment of the present invention is shown, which may be used to manufacture lamina stacks from a plurality of separate strips of stock material, such as the exemplary lamina stack 20 shown in FIGS. 1-4, or other lamina stacks which are made of two different types of materials. Referring to FIG. 6, die assembly 50 generally includes a lower die assembly 52 and an upper die assembly 54. Die assembly 50 is installed within a press (not shown) and, in operation, the press moves upper die assembly 54 upwardly and downwardly with respect to the fixed lower die assembly 52 in a known manner.

Referring to FIGS. 5 and 6, a plurality of stock material feeders 56 are used with die assembly 50 to feed a corresponding plurality of strips of stock material, such as strips 58 and 60, into die assembly 50 between lower die assembly 52 and upper die assembly 54. As described below, individual laminas 22 and 28 are shaped and blanked from strips 58 and 60, respectively, and are then stacked and interlocked within die assembly 50 to form lamina stacks 20. Strips 58 and 60 of stock material are mounted within each feeder 56 in the form of a coil, and each feeder 56 is operable to feed a respective strip 58 or 60 of stock material from the coils into die assembly 50 along the directions of the respective arrows in FIG. 6. In FIG. 6, the punch set 38 and other features associated with a first feed pathway and first material strip 58 are shown to the right of the vertical dashed line, and portions of an identical punch set 40 and other features associated with a second feed pathway and second material strip 60 are shown to the left of the vertical dashed line. However, the first and second punch sets 38 and 40 may vary if it is desired that laminas 22 and 28 include different features.

As described below, feeders 56 are independently operable with respect to one another, such that one feeder 56 may feed a first strip of stock material, such as strip 58, through die assembly 50 while the other feeder 56 is inoperative, such that the another strip of stock material, such as strip 60, is idled, and vise-versa. Alternatively, both feeders 56 may feed strips of stock material, such as first and second strips 58 and 60, through die assembly 50 concurrently.

Referring to FIGS. 5 and 6, lower die assembly 52 includes a lower die bed 62 (FIG. 6), which may be formed as a block of carbide positioned within the main body of lower die assembly 52, and a set of guide rails for guiding strips 58 and 60 of stock material through die assembly 50, including a pair of outer guide rails 64 and an inner guide rail 66. Only portions of guide rails 64 and 66 are shown in FIG. 5 for clarity, and a portion of each guide rail may optionally overlap a portions of the strips, as shown. One of the outer guide rails 64 and a corresponding, facing side of inner guide rail 66 together define a first feed pathway 68 extending through die assembly 50, through which first strip 58 of stock material is fed, and the other of the outer guide rails 64 and a corresponding, facing side of inner guide rail 66 together define a second feed pathway 70 extending through die assembly 50, through which second strip 60 of stock material is fed.

As shown in FIG. 5, die assembly 50 is generally rectangular-shaped, including four sides, and feeders 56 and feed paths 68 and 70 are configured to feed strips 58 and 60 of stock material into substantially opposite sides 34 and 36 of die assembly 50, respectively. However, in one alternate embodiment of die assembly 50 described below, strips 68 and 70 of stock material may be fed into die assembly 50 from the same side thereof, and in other embodiments, two strips of stock material may be fed into sides of die assembly 50 which are disposed 90° from one another, for example.

As shown in FIG. 6, lower die bed 62 of lower die assembly 52 includes a plurality of carbide die inserts 63 in operative alignment with the various punches of upper die assembly 54 for punching pilot holes and lamina features in strips 58 and 60 of stock material, and for blanking laminas from strips 58 and 60 in the manner described below. Lower die assembly 52 additionally includes choke assembly 72 at the blanking station of die assembly 50, which includes choke cavities adapted to receive laminas from each of the strips 58 and 60, as described below. Upper die assembly 54 includes a pair of punch sets 38 and 40, one each corresponding to, and aligned along, first and second feed pathways 68 and 70, respectively, which include individual punches which cooperate with the die inserts of lower die assembly 52 to punch lamina features in strips 58 and 60, including blanking punches at the blanking station of die assembly 50 for blanking, or separating, individual laminas from strips 58 and 60.

Referring to FIGS. 5 and 6, upper and lower die assemblies 52 and 54 include a plurality of die stations along first and second feed pathways 68 and 70 at which pilot holes and lamina features are punched in strips 58 and 70 of stock material. In first feed pathway 68, a pair of pilot hole punches 74 of upper die assembly 54 initially punch pilot holes 76 on opposite sides of strip 58 at Station 1A, which pilot holes 76 are engaged by pilot pins 78 of upper die assembly 54 at various locations throughout die assembly 50 to align and locate strip 58 at each station while other punches of the punch sets are performing stamping and/or blanking operations on strip 58. At Station 2A, punch 80 of upper die assembly 54 punches central opening 24 of first lamina 22, shown in FIG. 3. At Station 3A, punches 82 of upper die assembly 54 punch winding slots 26 of first lamina 22, shown in FIG. 3. At Station 4A, punches 84 punch arcuate-shaped portions within strip 58 to shape the outer periphery of each first lamina 22.

Each of punches 80, 82, and 84 may be selectively actuated to selectively punch the foregoing features in strip 58 for selectively shaping the different laminas 22, 26, and 38 in strip 58. Further details regarding the manner in which the punches of die assembly 50 may be selectively actuated, such as via hydraulic camming arrangements, are disclosed in the above-incorporated U.S. Pat. Nos. 4,619,028 and 6,163,949 to Neuenschwander. At Station 5A, four staking punches 86 are selectively actuated to punch interlock tabs 42 in first laminas 22 and, at Station 6A, four punches 88 punch apertures 46 in selected ones of first laminas 22. At blanking station 90, a blanking punch 92 separates an individual lamina from strip 58 while concurrently transferring same into a choke cavity of choke assembly 72 and interlocking the lamina with a next, adjacent lower lamina in the choke cavity, as described below. After a lamina is separated from strip 58 at blanking station 90, strip 58 is advanced some distance before a cutting punch (not shown) separates individual waste portions from the remainder of strip 58, which are discarded.

With continued reference to FIG. 6, second feed pathway 70 includes a punch set 40 which is identical to that of first feed pathway 68, although only portions of the punch set 40 of second feed pathway 70 are shown in FIGS. 5 and 6 for clarity. Alternatively, if it is desired that second laminas 28 include one or more features which are different from the features of first laminas 22, the punch set 40 of second feed pathway 70 may be configured differently from the punch set 38 of first feed pathway 68.

Die assembly 50 additionally includes choke assembly 72 which is adapted to receive laminas from each of first and second strips 58 and 60 of stock material. In a first embodiment, shown in FIGS. 7 and 8, the choke barrel of choke assembly 72 is rotatable to selectively align the choke cavities thereof with each of first and second strips 58 and 60 of stock material to selectively receive laminas from each of the strips. In a another embodiment, shown in FIG. 14, a modified choke assembly 150 is movable in a transverse direction with respect to the length of at least one of the first and second strips 58 and/or 60 to selectively align the choke cavities thereof with each of first and second strips 58 and 60 to receive laminas therefrom.

Figure 8:
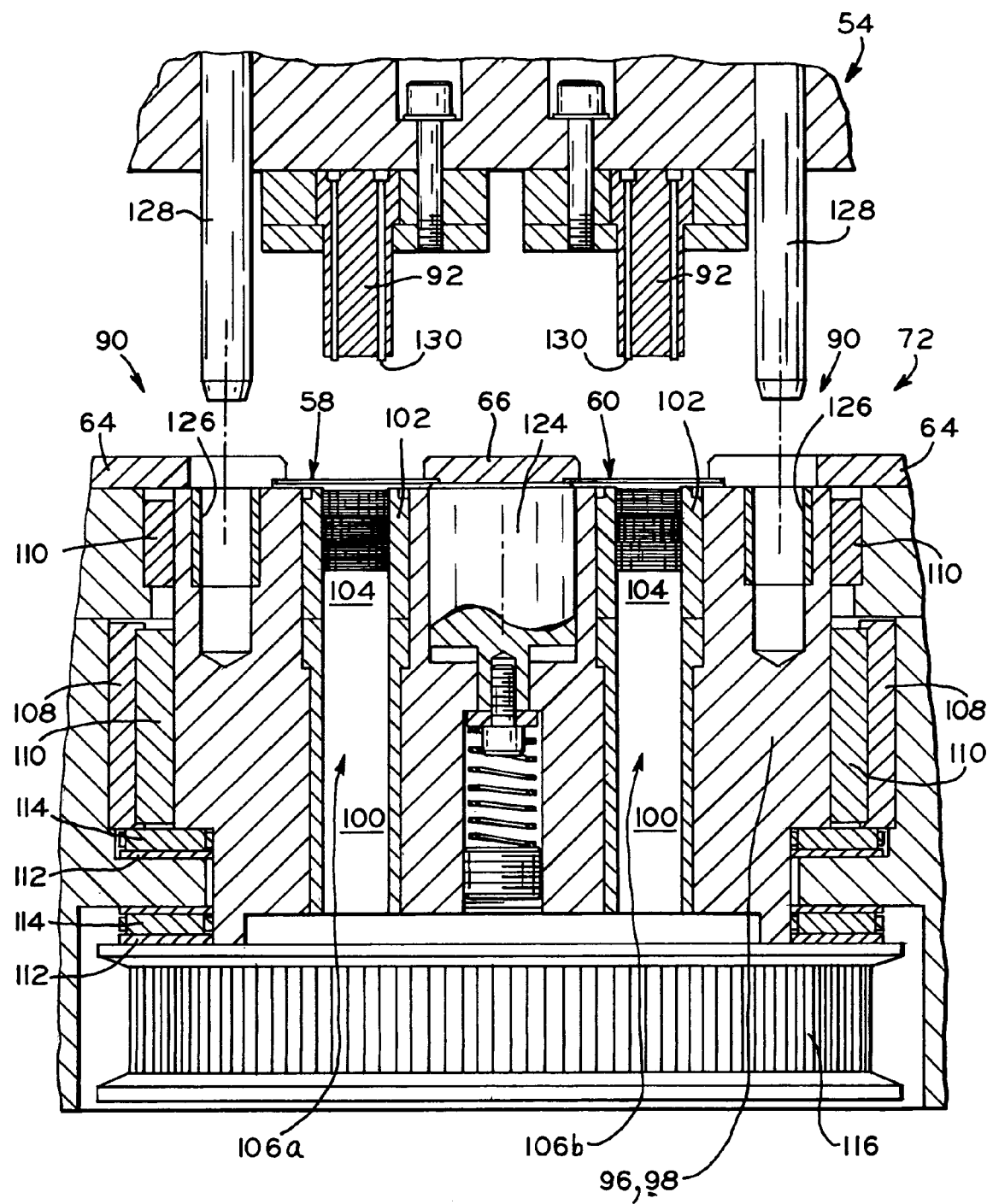
FIG. 8 is a sectional view taken along line 8-8 of FIG. 7, showing the blanking stations and the rotatable choke assembly at the beginning of a blanking stroke.

Referring to FIGS. 7 and 8, further details of choke assembly 72 according to the first embodiment are shown. Choke assembly 72 generally includes a choke barrel 96 rotatably disposed within lower die assembly 52. Choke barrel 96 is generally circular, and includes a lower body 98 having a pair of circular passageways 100, and an upper blanking die insert 102 having a pair of circular passageways 104 aligned with passageways 100, wherein passageways 100 and 104 together define a pair of choke cavities 106a and 106b. Choke barrel 96 is rotatably journalled in lower die assembly 52 by first sets of roller bearings, disposed vertically between choke barrel 96 and lower die assembly 52 and including bearing races 108 and bearings 110, and a second set of roller bearings, disposed horizontally between choke barrel 96 and lower die assembly 52 and including bearing races 112 and bearings 114.

Choke barrel 96 also includes a toothed sprocket or pulley 116 at a lower end thereof. As shown in FIG. 7, a toothed drive belt 118 is passed around pulley 116 and also around drive sprocket 120 of motor 122 which is operatively associated with a suitable die controller (not shown) of die assembly 50. In operation, motor 122 rotates drive sprocket 120 to in turn rotate choke barrel 96 within lower die assembly in the manner described below. Further details regarding the construction and operation of the controller of die assembly 50 are discussed in U.S. Pat. Nos. 4,619,028, 5,881,450, 6,163,949 and 6,192,575 to Neuenschwander, each assigned to the assignee of the present invention, the disclosures of which are expressly incorporated herein by reference. As shown in FIG. 8, choke barrel 96 additionally includes a spring-actuated stock lifter 124 for lifting strips 58 and 60 of stock material slightly above the die inserts of lower die assembly 52 and blanking die insert 102 of choke barrel 96, and a pair of guide pin bores 126 for receiving guide pins 128 of upper die assembly 54.

Referring to FIG. 8, upper die assembly 54 includes a pair of guide pins 128 which are received within guide pin bores 126 of choke barrel 96 during each downward die stroke of upper die assembly 54 to ensure proper alignment of upper die assembly 54 with respect to lower die assembly 52 and choke barrel 96 in a stamping operation. If guide pins 128 do not properly locate within guide pin bores 126 in a given die stroke, blanking punches 90 are disabled by a camming arrangement (not shown) within upper die assembly 54 to prevent damage to blanking punches 90, choke barrel 96, or other components of die assembly 50. Upper die assembly 54 additionally includes a pair of blanking punches 90 which are aligned with choke cavities 196 of choke barrel 96. Blanking punches 90 each additionally include a pair of staking punch inserts 130 which extend a small distance beneath blanking punches 90 for engaging interlock recesses 44 in the laminas of strips 58 and 60 of stock material and interlocking a blanked lamina with a lower adjacent lamina which has already been separated from a strip 58 or 60 of stock material.

Figure 9:
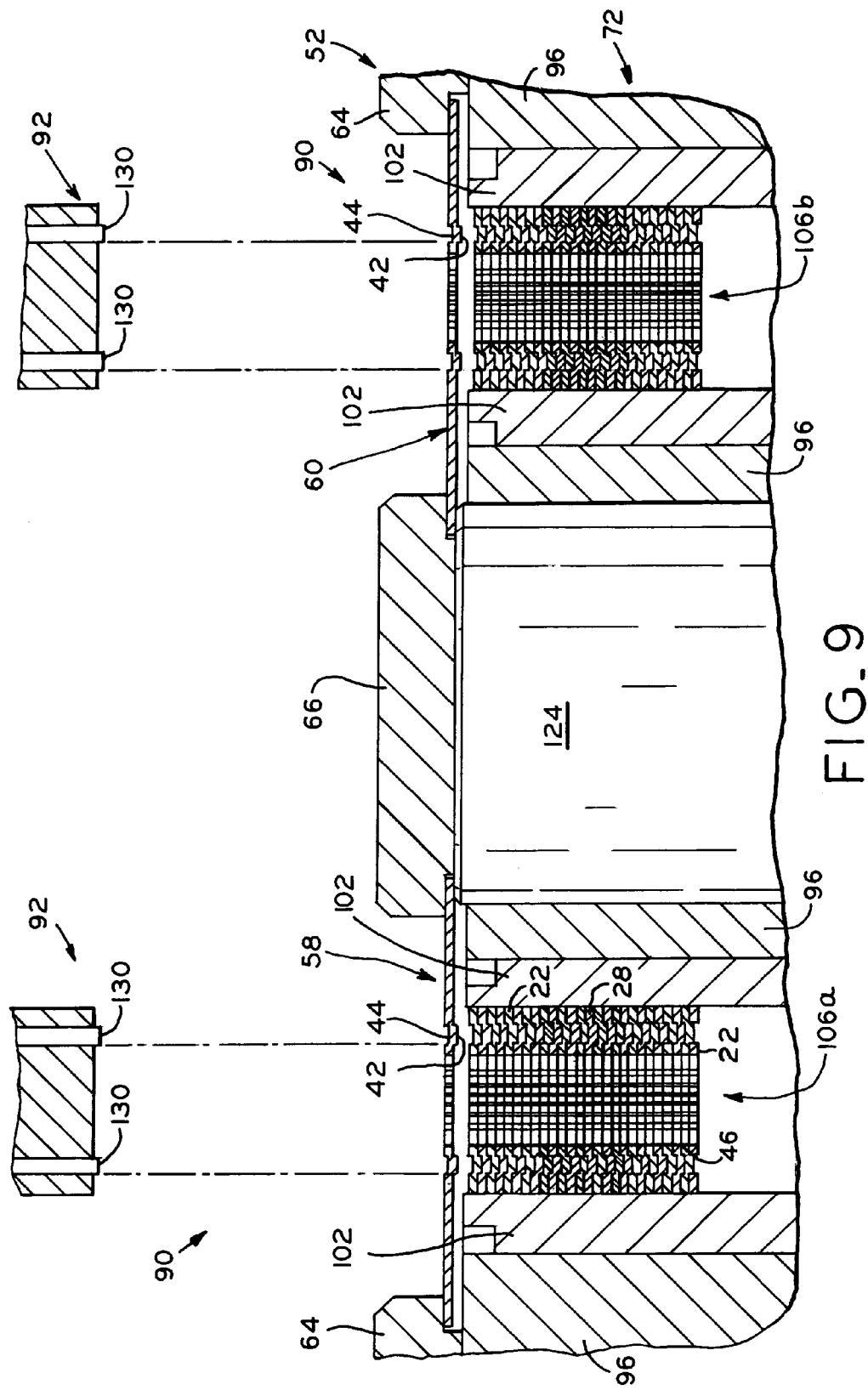
FIG. 9 is a view of a portion of FIG. 8.

With reference to FIGS. 8-12, a blanking operation is shown at blanking station 90 of die assembly 50, wherein a pair of laminas are concurrently blanked, one from each of strips 58 and 60, and are interlocked with other laminas within respective choke cavities 106a and 106b of choke barrel 96. In FIGS. 8 and 9, the die stroke corresponding to the blanking operation has not yet begun, and upper die assembly 54 is disposed upwardly of lower die assembly 52. Stock lifter 124 lifts strips 58 and 60 of stock material upwardly a small distance from blanking die insert 102 of choke barrel 96 and the remainder of lower die bed 62 of lower die assembly 52 to prevent interlock tabs 44, which have earlier been formed in strips 58 and 60 at previous die stations in the manner described above, from being biased upwardly into the horizontal plane of strips 58 and 60 or from being snagged on blanking die insert 102 or lower die bed 62 during progressive movement of strips 58 and 60.

Figure 10:
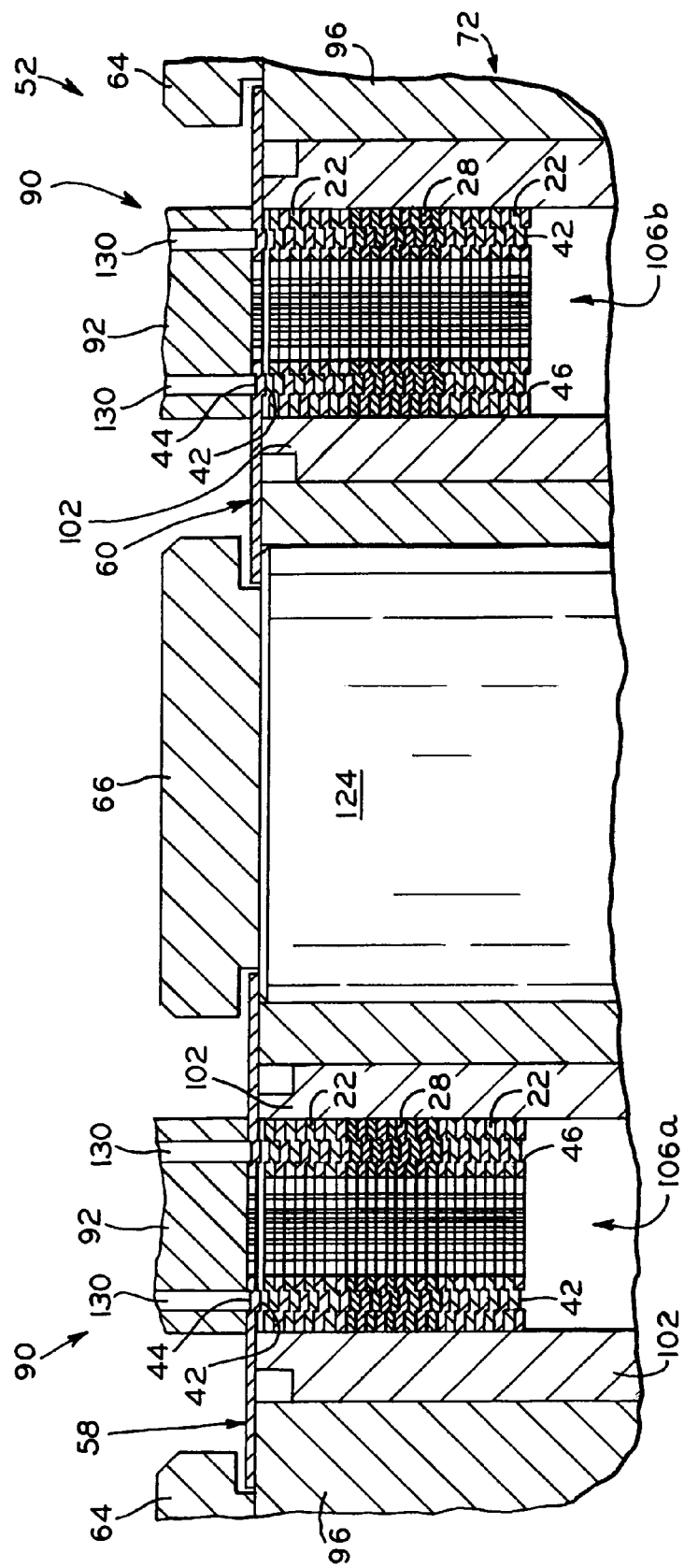
FIG. 10 is a further view of a portion of FIG. 8, showing the initial engagement of the blanking punches with the material strips.

In FIG. 10, the die stroke has begun, and upper die assembly 54 has moved downwardly to engage and locate guide pins 128 thereof within guide pin recesses 126 of lower die assembly 54. Staking punch inserts 130 of blanking punches 92 are engaged within corresponding interlock recesses 44 of strips 58 and 60 with respect to a respective pair of laminas which will be blanked from strips 58 and 68. Concurrently, the remainder of blanking punches 92 are also brought into abutment with strips 58 and 60, and strips 58 and 60 are pressed downwardly thereby against the spring bias of stock lifter 124 and into abutment with blanking die insert 102 of choke barrel 96.

Figure 11:
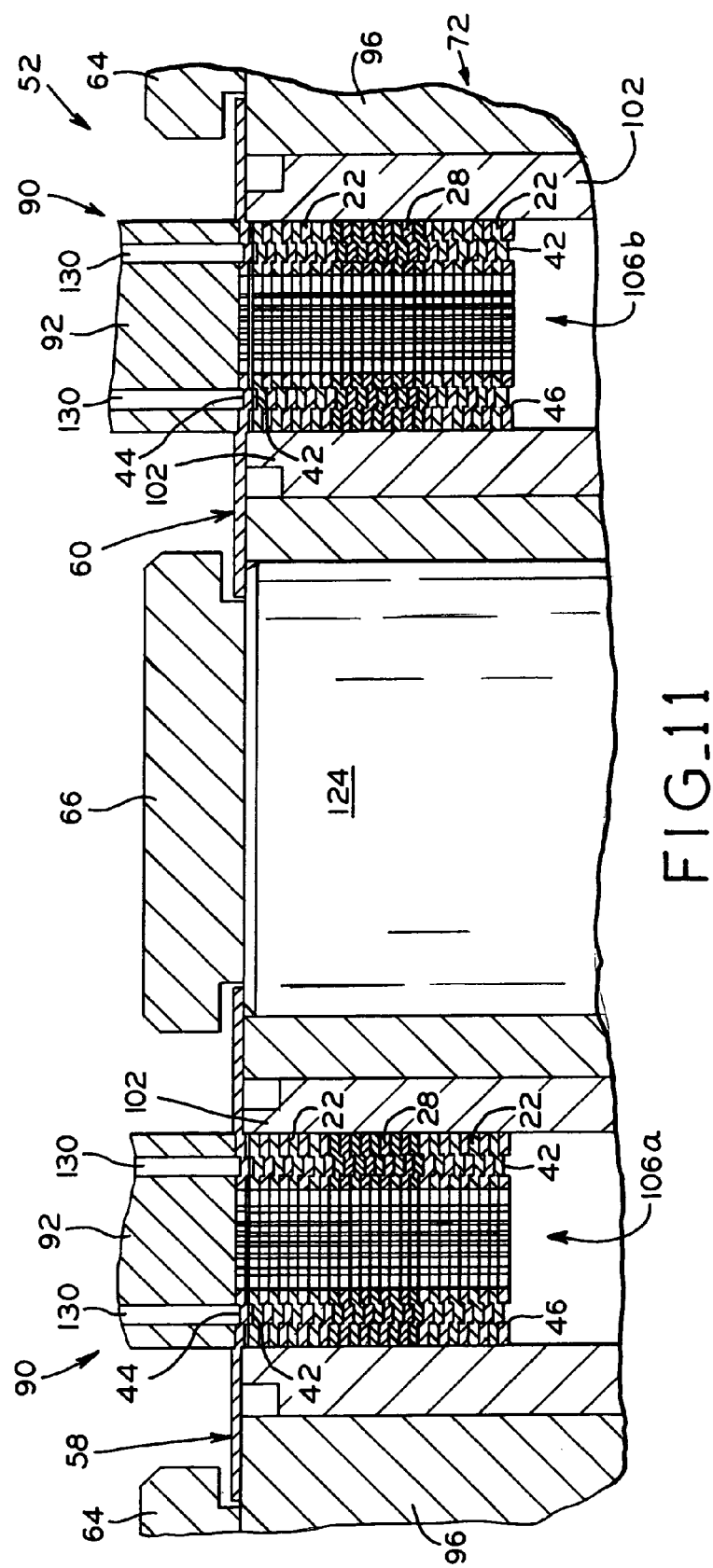
FIG. 11 is a further view of a portion of FIG. 8, showing partial separation of individual laminas from the strips of stock material with concurrent interlocking of the interlock tabs of the laminas with the interlock recesses of lower, adjacent laminas in the choke assembly.

In FIG. 11, continued downward movement of upper die assembly 54 in the die stroke moves blanking punches 92 downwardly, beginning to sever individual laminas from the remainder of their respective strips 58 and 60 while concurrently beginning to press the interlock tabs 42 of the laminas into tight engagement within the corresponding interlock recesses 44 of respective adjacent laminas previously blanked into choke cavities 106a and 106b. In this manner, the laminas which are to be blanked from strips 58 and 60 begin interlocking with their respective next, lower adjacent laminas within choke cavities 106a and 106b before being severed from strips 58 and 60, such that each lamina may include two or more discrete portions or segments, as discussed in detail in the above-incorporated U.S. Pat. No. 6,163,949 to Neuenschwander. Concurrently, the circular outer peripheries of the laminas are forced into tight frictional engagement with the inner surfaces of their respective choke cavities 106a and 106b. In this manner, the laminas within choke cavities 106a and 106b, which have already been blanked from strips 58 and 60 and transferred into choke cavities, collectively provide a large amount of resistance or back pressure which facilitates the interlocking of the partially severed laminas with the lower, adjacent laminas within choke cavities 106a and 106b.

Figure 12:
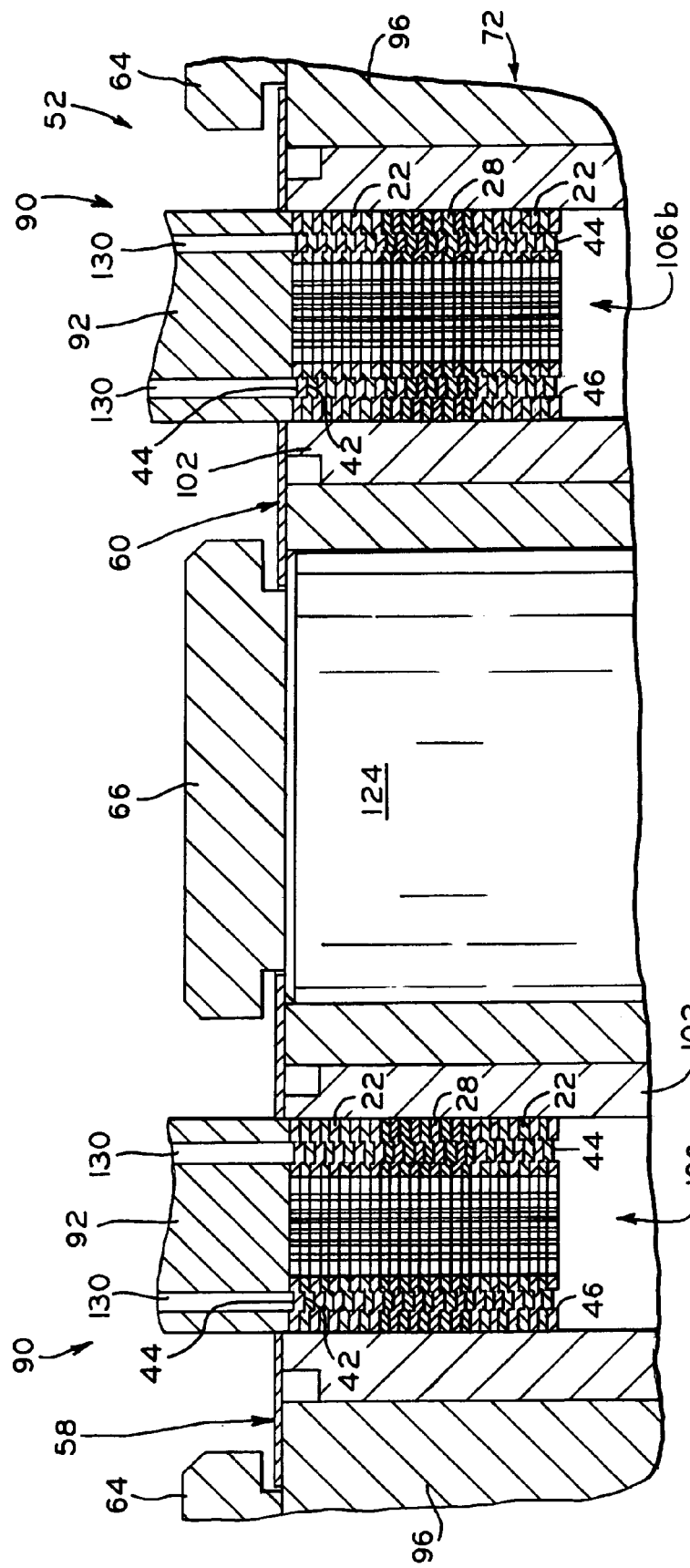
FIG. 12 is a further view of a portion of FIG. 8, showing the separation of the individual laminas from the strips of stock material at the completion of the blanking stroke.

In FIG. 12, continued downward movement of upper die assembly 54 in the die stroke causes blanking punches 92 to completely severe the individual laminas from their respective strips 58 and 60 of stock material, and the interlock tabs 42 of the blanked laminas are pressed by staking punch inserts 130 into complete, tight, interlocked engagement with the interlock recesses 44 of their respective, adjacent lower laminas. Thereafter, die assembly 54 and blanking punches 92 move upwardly and away from strips 58 and 60, and stock lifter 124 lifts strips 58 and 60 slightly upwardly away from blanking die insert 102 of choke barrel 96 and lower die bed 62 of lower die assembly 52, as described above. Further details regarding the above-described blanking operation are discussed in U.S. Pat. No. 6,163,949 to Neuenschwander with respect to a die which includes a single blanking punch which is operable to blank laminas from a single strip of stock material into a single choke cavity, however, the overall blanking sequences between the foregoing die and the present die are similar.

Referring to FIGS. 5, 7, and 8, the operation of choke assembly 72 will now be described. In FIG. 5, choke assembly 72 is disposed in a first position in which choke barrel 96 is rotated to align a first choke cavity 106a thereof with first feed pathway 68 and first strip 58 such that choke cavity 106a is disposed directly beneath the blanking punch 92 in the punch set 38 associated with first feed pathway 68. In this position, the other choke cavity 106b is aligned with second feed pathway 70 and second strip 60 such that choke cavity 106b is disposed directly beneath the blanking punch 92 in the punch set 40 associated with second feed pathway 70. Thus, in a blanking operation as described above, one lamina will be blanked from first strip 58, transferred into choke cavity 106a, and interlocked with an adjacent, lower lamina therein, while concurrently, another lamina will be blanked from second strip 60, transferred into choke cavity 106b, and interlocked with an adjacent, lower lamina therein.

Thereafter, or at any other desired time during operation of die assembly 50, choke barrel 96 may be rotated, such as through an angle of 180° as shown, to a second position in which in which choke barrel 96 is rotated to align choke cavity 106a with second feed pathway 70 and second strip 60 such that choke cavity 106a is disposed directly beneath the blanking punch 92 in the punch set 40 associated with second feed pathway 68. In this position, the other choke cavity 106b is aligned with first feed pathway 68 and first strip 58 such that choke cavity 106b is disposed directly beneath the blanking punch 92 in the punch set 38 associated with first feed pathway 68. Thus, in a subsequent blanking operation, one lamina will be blanked from first strip 58, transferred into choke cavity 106*b*, and interlocked with an adjacent, lower lamina therein, while concurrently, another lamina will be blanked from second strip 60, transferred into choke cavity 106*a*, and interlocked with an adjacent, lower lamina therein. In this manner, choke barrel 96 is rotatable to selectively receive laminas from each of first and second strips 58 and 60 within choke cavities 106*a* and 106*b* thereof.

Below, several exemplary steps for manufacturing the exemplary lamina stack 20 of FIGS. 1-4 using die assembly 50 of the present invention are described. However, it should be understood that one of ordinary skill in the art, using the teachings herein, could modify the construction and operation of die assembly 50 to manufacture the exemplary lamina stacks 20 according to a different operational sequence, and/or could modify the construction and operation of die assembly 50 to manufacture other types of lamina stacks.

To manufacture the exemplary lamina stack 20, shown in FIGS. 1-4, first strip 58 is first fed into die assembly 50 by its feeder 56, and the punches in punch set 38 associated with first feed pathway 68 are actuated as described above to shape the features of one or more first laminas 22 having apertures 46, rather than interlock tabs 42 and recesses 44, which are thereafter blanked into choke cavity 106*a* when choke assembly 72 is in the first position. Although the exemplary lamina stack 20 only includes one first lamina 22 having apertures 46 as described above, it may be desired or necessary at the start of a manufacturing operation to blank a plurality of first laminas 22 having apertures 46 into choke cavity 106*a*, whereby the outer edges of the laminas are frictionally engaged within choke cavity 106*a* to provide a sufficient back pressure of laminas within choke cavity 106*a* to facilitate the interlocking of subsequent laminas blanked into choke cavity 106*a*, as described above. Then, a plurality of first laminas 22 having interlock tabs 42 and recesses 44 are shaped, blanked, and interlocked with the initial first lamina 22 within choke cavity 106*a*. During these initial steps, second strip 60 may be idled by its feeder 56.

Thereafter, choke assembly 72 is rotated from its first position to its second position through an angle of 180° as shown, such that choke cavity 106*a*, including one or more first laminas 22 therein, is aligned with second strip 60, while choke cavity 106*b*, which is empty, is aligned with first strip 58. First and second strips 58 and 60 are then concurrently fed into die assembly 58, and the punches of punch set 38 associated with first feed pathway 68 are actuated to shape the features of one or more first laminas 22 in first strip while the punches of punch set 40 associated with second feed pathway 70 are concurrently actuated to shape the features of one or more second laminas 28 in second strip 60, and one or more first laminas 22 are blanked from first strip 58 into choke cavity 106*b* concurrently with blanking one or more second laminas 28 into choke cavity 106*a* from second strip 60 and interlocking same with the uppermost first lamina 22 in choke cavity 106*a* and with one another. Thereafter, choke barrel 96 is rotated back to its first position, such that a plurality of first and second laminas 22 and 28 may be shaped in first and second strips 58 and 60, respectively, and then blanked into choke cavities 106*a* and 106*b* and interlocked.

The foregoing operational steps are repeated to concurrently manufacture a plurality of lamina stacks 20 and interlock same within choke cavities 106*a* and 106*b* of choke barrel 96 by selectively rotating choke barrel 96 to receive laminas from each of first and second strips 58 and 60 while independently feeding first and second strips 58 and 60 into die assembly 50. Thus, die assembly 50 may be used to quickly and efficiently manufacture lamina stacks, such as the exemplary stack 20 shown in FIGS. 1-4, which include interleaved layers made from first and second different types of materials. In this manner, the need for manual assembly steps, such as the assembly of portions of each stack which are made from different materials using a manual press, for example, is eliminated.

Although choke assembly 72 rotates between its first and second positions through an angle of 180° as shown herein, the angle through which choke assembly 72 rotates may vary depending upon such factors as the number of material strips used, and the position and orientation of the material strips with respect to one another. Further, although each portion of the exemplary lamina stack 20 of FIGS. 1-4 includes a plurality of first or second laminas 22 or 28, die assembly 50 is also operable to manufacture lamina stacks wherein single, differing laminas are interleaved with respect to one another, for example, other lamina stacks manufacturable by die assembly 50 may include a plurality of different types of laminas stacked in an alternating manner with respect to one another.

Die assembly 50 has been described above with respect to first and second strips 58 and 60 of stock material, wherein die assembly 50 includes punch sets 38 and 40 and blanking punches 92 operable to shape and blank a single row of laminas from each strip, and choke assembly 72 of die assembly 50 includes two corresponding choke cavities 106*a* and 106*b*. However, the number of laminas which are formed and blanked from each strip by the die assembly, and the number of choke cavities provided within the choke barrel of the die assembly, may vary.

Figure 13:
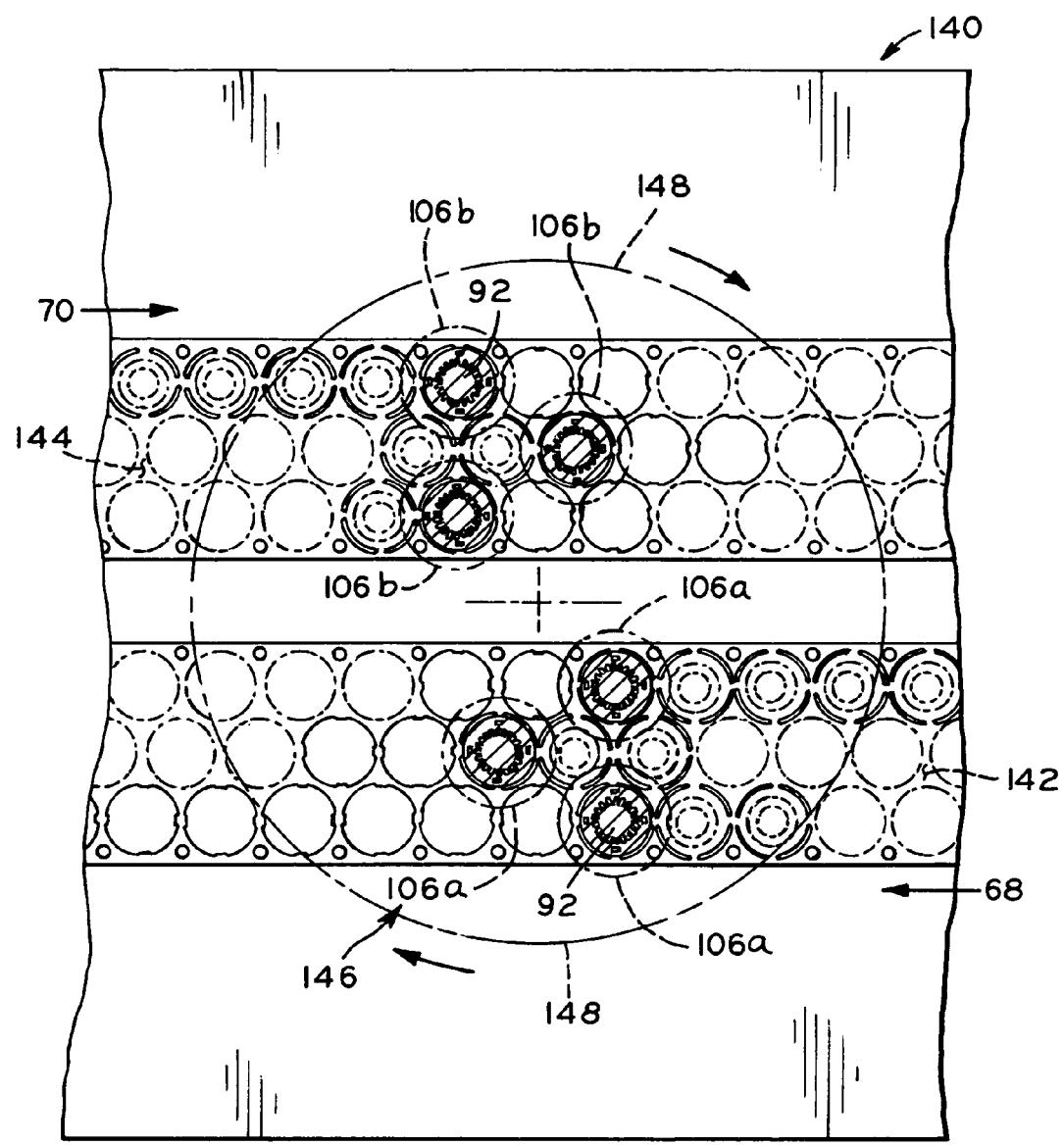
FIG. 13 is a top view of a portion of a lower die assembly of a die assembly according to a second embodiment, showing portions of the strip layouts of a pair of separate strips of stock material which may be fed into the die, each strip including three nested rows of laminas, and further showing a rotatable choke assembly including first and second pluralities of choke cavities.

For example, referring to FIG. 13, die assembly 140 according to a second embodiment of the present invention is shown. Except as described below, die assembly 140 includes many features which are identical to those of die assembly 50, and identical reference numerals have been used to indicate identical or substantially identical features therebetween. Die assembly 140 is configured to receive strips 142 and 144 of stock material which are relatively wider than strips 58 and 60 of die assembly 50. Further, die assembly 140 includes multiple punch sets, similar to those of die assembly 50 described above, associated with each of strips 142 and 144 such that die assembly 140 may shape three rows of laminas in each of first and second strips 142 and 144. In order to conserve stock material, the individual laminas of the lamina rows which are shaped in each of strips 142 and 144 are staggered or nested with respect to one another.

Additionally, die assembly 140 includes choke assembly 146 similar to choke assembly 96 of die assembly 50, which includes rotatable choke barrel 148 having two pluralities of choke cavities 106, shown in FIG. 13 as a first plurality of three choke cavities 106*a* and a second plurality of three choke cavities 106*b*. Choke cavities 106*a* of the first plurality and choke cavities 106*b* of the second plurality are located within choke barrel 148 in an arrangement wherein choke barrel 148 may be rotated between a first position, in which the three choke cavities 106*a* of the first plurality are respectively aligned with the three rows of laminas of first strip 142 and the punch sets and blanking punches associated therewith, while choke cavities 106*b* of the second plurality are respectively aligned with the three rows of laminas of second strip 144 and the punch sets and blanking punches associated therewith. In this manner, die assembly 140 is operable in the same manner as die assembly 50, however, die assembly 140 may advantageously manufacture six lamina stacks concurrently.

Referring to FIG. 14, die assembly 150 according to a third embodiment is shown. Except as described below, die assembly 150 includes many features which are identical to those of die assembly 50, and identical reference numerals have been used to indicate identical or substantially identical features therebetween. Die assembly 150 includes a lower die assembly 152 which, similar to lower die assembly 52 of die assembly 50, includes outer and inner guide rails 154 and 156, respectively, defining first and second feed paths 158 and 160 therebetween for strips 58 and 60 of stock material. In die assembly 150, first and second feed paths 158 and 160 are parallel to one another, and receive strips 58 and 60 from feeders from the same side of die assembly 150.

Die assembly 150 includes a plurality of punches for punching features in first and second strips 58 and 60 of stock material in the same manner as die assembly 50, described above, and also includes a choke assembly 162. Choke assembly 162 is slidably mounted upon a pair of rails 164. A hydraulic or air cylinder 166 includes a piston 168 attached to choke assembly 162. Cylinder 166 is operable responsive to control signals from a suitable controller, such as those disclosed in the above-incorporated U.S. Pat. No. 4,619,028 to Neuenschwander, to slide choke assembly 162 along rails 164 in directions which are transverse with respect to the direction of feed paths 158 and 160 and the lengths of stock strips 58 and 60.

As described below, choke assembly 162 includes choke cavities which may thereby receive laminas from each of stock strips 58 and 60. Alternatively, if feed paths 158 and 160 are not parallel, but rather are disposed at an angle with respect to one another, choke assembly 162 may be configured to slide in an arcuate manner to enable the choke cavities thereof to receive laminas from each of stock strips 58 and 60. Also, choke assembly may be driven by other means, such as by a linear motor, or by a rotational motor via a screw-type drive mechanism.

Choke assembly 162 additionally includes two or more choke cavities 170a and 170b therein, and choke assembly 162 is slidable to selectively align choke cavities 170a and 170b with first and second feed pathways 158 and 160 and the blanking punches associated therewith such that choke cavities 170a and 170b may selectively receive laminas blanked from each of first and second strips 58 and 60. For example, in a first position, choke cavity 170a is aligned with first feed pathway 158 and first strip 58 while choke cavity 170b may be aligned with second feed pathway 160 and second strip 60. In a second position, choke cavity 170a is aligned with second feed pathway 160 and second strip 60 while choke cavity 170b is moved out of alignment with first and second feed pathways 158 and 160. In a third position, choke cavity 170b is aligned with first feed pathway 158 and first strip 58 while choke cavity 170a is moved out of alignment with first and second feed pathways 158 and 160. In operation, choke assembly 162 may be selectively shuttled between each of the first, second, and third positions in order to selectively receive laminas from strips 58 and 60 within choke cavities 170a and 170b.

Additionally, similar to die assembly 140, choke assembly 162 of die assembly 150 may include multiple sets of choke cavities 170a and 170b if die assembly 150 is configured to shape and blank a plurality of rows of laminas from each strip 58 and 60 of stock material.

Although the foregoing die assemblies 50, 140, and 150 have been described in the context of manufacturing lamina stacks including interleaved layers of laminas obtained from a plurality of strips of different material types, a further benefit of die assemblies 50, 140, and 150 and the methods described herein is that manufacturing lamina stacks using materials from two different strips of the same type of stock material can potentially aid in correcting for material inconsistencies and/or variations within each strip, such as thickness variations, as discussed in the above-incorporated U.S. Pat. Nos. 4,619,028, 5,241,138, 5,881,450 and 6,192,575 to Neuenschwander. In this regard, die assemblies 50, 140, and 150 and the methods described herein are also useful to manufacture lamina stacks which include interleaved layers each made from the same material, such as when both strips 58 and 60, for example, are of the same material.

For example, die assemblies 50, 140, and 150 may be configured to use two separate strips of the same material, with the strips having differing thicknesses and/or differing widths. In particular, if a lamina stack is desired which includes individual laminas having different outer diameters, the die assembly may be configured to stamp laminas of a first type, such as laminas having a relatively shorter diameter, from a first strip according to first progression, and stamp laminas of a second type, such as laminas having a relatively longer diameter, from a second strip according to a second, different progression. In this manner, stock material is conserved because the need to stamp both small and large diameter laminas from the same strip of stock material, as in known die assemblies, is obviated.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A die assembly for manufacturing lamina stacks from a plurality of separate strips of stock material, comprising:
   a first punch set including at least two first punches configured to punch laminas from a strip of material, said at least two first punches disposed along a first feed path;
   a second punch set including at least two second punches configured to punch laminas from another, separate strip of material, said at least two second punches disposed along a second feed path, said first and second feed paths parallel to one another; and
   a choke assembly adapted to receive at least one lamina punched from each of the strips to form a lamina stack.

2. The die assembly of claim 1, further comprising a plurality of feeders, one of said feeders adapted to feed strips of stock material to said first punch set and another of said feeders adapted to feed strips of stock material to said second punch set, said feeders independently operable with respect to one another.

3. The die assembly of claim 1, wherein said die assembly has first and second sides, said first feed path extending into said die assembly from said first side; and
   said second feed path extending into said die assembly from said second side.

4. The die assembly of claim 3, wherein said first and second sides are disposed on substantially opposite sides of said die assembly.

5. The die assembly of claim 1, wherein each of said first and second punch sets includes at least one blanking punch operable to blank laminas from the strips.

6. The die assembly of claim 1, wherein at least one of said first and second punch sets further comprises at least one staking punch configured to punch an interlock tab in a strip of material.

7. A die assembly for manufacturing lamina stacks from a plurality of separate strips of stock material, comprising:
   a first punch set including at least two punches configured to punch laminas from strip of material;
   a second punch set including at least two punches configured to punch laminas from another, separate strip of material; and
   a choke assembly adapted to receive at least one lamina punched from each of the strips to form a lamina stack, said choke assembly including at least one choke cavity, said choke assembly movable substantially transversely relative to the length of at least one of the strips to selectively receive laminas from each of the strips.

8. The die assembly of claim 7, wherein said choke assembly includes a plurality of said choke cavities, said choke assembly movable substantially transversely between a first position in which said plurality of choke cavities are positioned to receive laminas from said first punch set and a second position in which said plurality of choke cavities are positioned to receive laminas punched from each of the strips by the said first and second punch sets.

9. The die assembly of claim 7, wherein at least one of said first and second punch sets further comprises at least one staking punch configured to punch an interlock tab in a strip of material.

10. A die assembly for manufacturing lamina stacks from a plurality of separate strips of stock material, comprising:
    a first punch set including at least two punches configured to punch laminas from a strip of material;
    a second punch set including at least two punches configured to punch laminas from another, separate strip of material; and
    a choke assembly adapted to receive at least one lamina punched from each of the strips to form a lamina stack, said choke assembly including at least one choke cavity, said choke assembly rotatable to selectively position said at least one choke cavity to receive laminas punched from each of the strips by the said first and second punch sets.

11. The die assembly of claim 10, wherein said choke assembly includes at least first and second choke cavities, said choke assembly rotatable between a first position in which said first choke cavity is positioned to receive laminas from said first punch set and said second choke cavity is positioned to receive laminas from said second punch set, and a second position in which said first choke cavity is positioned to receive laminas from said second punch set and said second choke cavity is positioned to receive laminas from said first punch set.

12. The die assembly of claim 10, wherein said choke assembly includes a first plurality of choke cavities and a second plurality of choke cavities, said choke assembly selectively rotatable between:
    a first position in which said first plurality of choke cavities are positioned to receive laminas from said first punch set and said second plurality of choke cavities are positioned to receive laminas from said second punch set; and
    a second position in which said first plurality of choke cavities are positioned to receive laminas from said second punch set and said second plurality of choke cavities are positioned to receive laminas from said first punch set.

13. The assembly of claim 10, wherein at least one of said first and second punch sets further comprises at least one staking punch configured to punch an interlock tab in a strip of material.

14. A die assembly for manufacturing lamina stacks from first and second separate strips of stock material, comprising:
    a first feed pathway into which the first strip of stock material may be fed;
    a second feed pathway into which the second strip of stock material may be fed, said first and second feed pathways parallel to one another;
    blanking punches associated with said first and second feed pathways, said blanking punches operable to blank laminas from the first and second strips; and
    at least one choke assembly adapted to receive at least one lamina blanked from the first strip and at least one lamina blanked from the second strip to form a lamina stack.

15. The die assembly of claim 14, wherein said die assembly includes first and second sides, said first feed path extending into said die assembly from said first side and said second feed path extending into said die assembly from said second side.

16. The die assembly of claim 15, wherein said first second sides are disposed on substantially opposite sides of said die assembly.

17. The die assembly of claim 14, further comprising a plurality of feeders, one of said feeders operable to feed strips of stock material into said first feed pathway and another of said feeders operable to feed strips of stock material into said second feed pathway, said feeders independently operable with respect to one another.

18. The die assembly of claim 14, further comprising at least one staking punch configured to punch an interlock tab in a strip of material.

19. A die assembly for manufacturing lamina stacks from first and second separate strips of stock material, comprising:
    a first feed pathway into which the first strip of stock material may be fed;
    a second feed pathway into which the second strip of stock material may be fed;
    blanking punches associated with said first and second feed pathways, said blanking punches operable to blank laminas from the first and second strips; and
    at least one choke assembly adapted to receive at least one lamina blanked from the first strip and at least one lamina blanked from the second strip to form a lamina stack, said choke assembly including at least one choke cavity, said choke assembly movable transversely with respect to a length of at least one of said first and second strips to selectively align said at least one choke cavity with each of said first and second blanking punches.

20. The die assembly of claim 19, further comprising:
    a first plurality of blanking punches associated with said first feed pathway and a second plurality of blanking punches associated with said second feed pathway; and a choke assembly including a plurality of choke cavities, said choke assembly movable transversely between a first position in which said plurality of choke cavities are aligned with respective blanking punches of said first plurality of blanking punches and a second position in which said plurality of choke cavities are aligned with respective blanking punches of said second plurality of blanking punches.

21. The die assembly of claim 19, further comprising at least one staking punch configured to punch an interlock tab in a strip of material.

22. A die assembly for manufacturing lamina stacks from first and second separate strips of stock material, comprising:
- a first feed pathway into which the first strip of stock material may be fed;
- a second feed pathway into which the second strip of stock material may be fed;
- blanking punches associated with said first and second feed pathways, said blanking punches operable to blank laminas from the first and second strips; and
- at least one choke assembly adapted to receive at least one lamina blanked from the first strip and at least one lamina blanked from the second strip to form a lamina stack, said choke assembly including at least one choke cavity, said choke assembly rotatable to selectively position said at least one choke cavity to receive laminas blanked from each of said first and second blanking punches.

23. The die assembly of claim 22, wherein said choke assembly includes at least first and second choke cavities, said choke assembly rotatable between a first position in which said first choke cavity is aligned with said first blanking punch and said second choke cavity is aligned with said second blanking punch, and a second position in which said first choke cavity is aligned with said second blanking punch and said second choke cavity is aligned with said first blanking punch.

24. The die assembly of claim 22, further comprising:
- a first plurality of blanking punches associated with said first feed pathway and a second plurality of blanking punches associated with said second feed pathway;
- a choke assembly having a first plurality of choke cavities and a second plurality of choke cavities, said choke assembly selectively rotatable between:
  - a first position in which said first plurality of choke cavities are aligned with respective blanking punches of said first plurality of blanking punches and said second plurality of choke cavities are aligned with respective blanking punches of said second plurality of blanking punches; and
  - a second position in which said first plurality of choke cavities are aligned with respective blanking punches of said second plurality of blanking punches and said second plurality of choke cavities are aligned with respective blanking punches of said first plurality of blanking punches.

25. The die assembly of claim 22, further comprising at least one staking punch configured to punch an interlock tab in a strip of material.

26. A die assembly for manufacturing lamina stacks from a plurality of separate strips of stock material, comprising:
- a first punch set including at least two punches configured to punch laminas from a strip of material, said first punch set including a first blanking punch;
- a second punch set including at least two punches configured to punch laminas from another, separate strip of material, said second punch set including a second blanking punch, said second blanking punch separate from said first blanking punch; and
- a choke assembly adapted to receive at least one lamina punched from each of the strips to form a lamina stack, wherein said choke assembly includes at least one choke cavity, said choke assembly movable substantially transversely relative to the length of at least one of the strips to selectively receive laminas from each of the strips.

27. The die assembly of claim 26, wherein said die assembly has first and second sides, said die assembly further comprising:
- a first feed path along which said first punch set is aligned, said first feed path extending into said die assembly from said first side; and
- a second feed path along which said second punch set is aligned, said second feed path extending into said die assembly from said second side.

28. The die assembly of claim 27, wherein said first and second sides are disposed on substantially opposite sides of said die assembly.

29. The die assembly of claim 26, wherein at least one of the said first and second punch sets further comprises at least one staking punch configured to punch an interlock tab in a strip of material.

30. A die assembly for manufacturing lamina stacks from plurality of separate strips of stock material, comprising:
- a first punch set including at least two punches configured to punch laminas from a strip of material, said punch set including a first blanking punch;
- a second punch set including at least two punches configured to punch laminas from another, separate strip of material, said second punch set including a second blanking punch, said second blanking punch separate from said first blanking punch; and
- choke assembly adapted to received at least one lamina punched from each of the strips to form a lamina stack, wherein said choke assembly includes at least one choke cavity, said choke assembly rotatable to selectively position said at least one choke to receive lamina punched from each of the strips by the said first and second punch sets.

* * * * *